May 16, 1961 J. E. RANSOM 2,984,283
TIRE VALVE STEM HOLDER
Filed March 10, 1958 2 Sheets-Sheet 1

John E. Ransom
INVENTOR.

BY *Clarence A. O'Brien*
*and Harvey B. Jacobson*
Attorneys

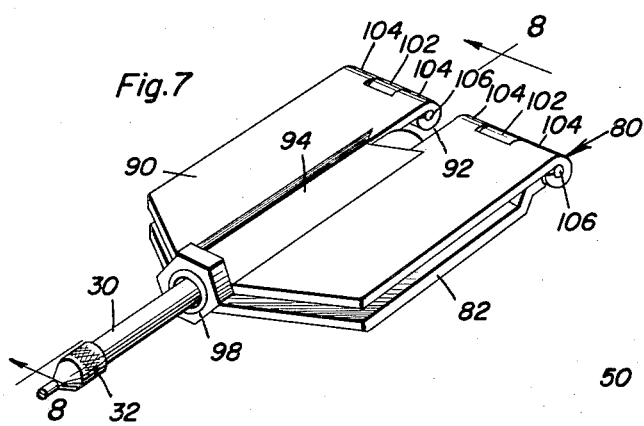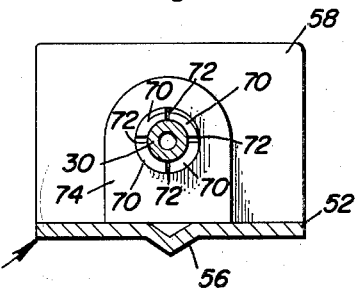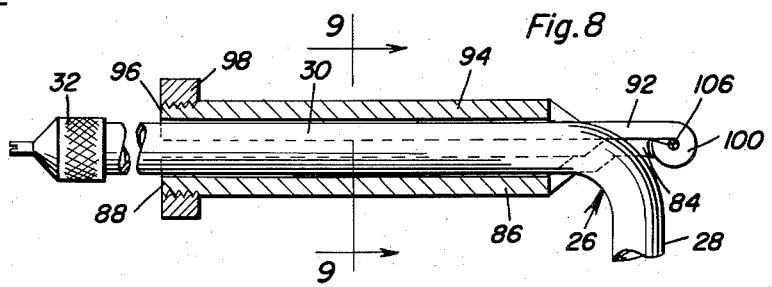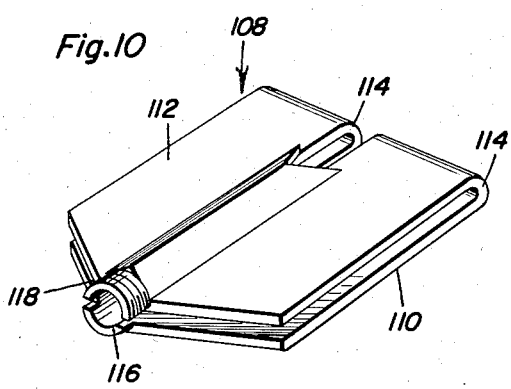

United States Patent Office 2,984,283
Patented May 16, 1961

2,984,283
TIRE VALVE STEM HOLDER

John E. Ransom, Atlanta, Ga., assignor to Mechanex Corporation, a corporation of Colorado Filed Mar. 10, 1958, Ser. No. 720,409

2 Claims. (Cl. 152—427)

This invention relates in general to new and useful improvements in vehicle wheel construction, and more specifically to a tire valve stem holder for truck tires.

When a tire of a dual wheel assembly becomes deflated due to a puncture from nails, etc., particularly when the dual wheel assembly is on a trailer, it is extremely difficult for the operator of the truck or tractor-trailer rig to determine this, and as a result the operator normally continues to drive the truck or tractor-trailer rig until he reaches his normal tire check point. As a result, in many instances due to the fact that the tire is deflated and the wheel is run flat, the valve stem of the tube pulls through the wheel inside of the tire. As the tire continues to rotate, the valve stem revolves around in the tire and soon cuts through the cords from the interior of the tire thus ruining the tire. On other occasions, due to the intense heat built up in the tire, the tube melts and welds to the core of the tire with the result that the internal construction of the tire becomes a mass of rough rubber segments which also results in the tire becoming a total loss.

It is therefore the primary object of this invention to provide a tire valve stem holder, the valve stem holder being so constructed whereby it may be readily clamped on a valve stem and when so clamped on the valve stem will prevent the valve stem from pulling through the wheel into the tire and thus permitting rotation of the tube and valve stem relative to the tire and the resultant destroying of the tire.

Another object of this invention is to provide an improved valve stem holder for the valve stems of truck tires and tubes, the holder being so constructed whereby it may be readily manufactured at a low cost so as to be economically feasible.

Another object of this invention is to provide an improved truck tire valve stem holder, the holder being of such a nature whereby it may be readily clamped on the projecting portion of a valve stem and which will so engage the wheel of the truck so as to position the valve stem relative to the wheel and thus prevent the pulling of the valve stem down into the tire and through the wheel in case the tire becomes deflated.

A further object of this invention is to provide an improved holder or clamp for valve stems of truck tires, the valve stem holder being of an extremely simple construction whereby it may be readily inserted on a valve stem either on the outer tire or the inner tire of a dual wheel assembly.

A still further object of this invention is to proivde an improved valve stem holder for the valve stems of truck tires, the valve stem holder being formed of a minimum number of pieces whereby it may be readily handled and readily positioned on a valve stem so as to both be labor saving in operation and to minimize the possible loss of components thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is an enlarged longitudinal sectional view taken substantially upon the plane indicated by the section line 5—5 of Figure 4 and shows further the details of the construction of the valve stem holder and the relationship thereof with respect to the valve stem;

Figure 6 is an enlarged transverse sectional view taken substantially upon the plane indicated by the section line 6—6 of Figure 5 and shows further the details of the construction of the valve stem holder;

Figure 7 is an enlarged perspective view of still another form of valve stem holder, the valve stem holder being shown mounted on a valve stem;

Figure 8 is an enlarged longitudinal sectional view taken substantially upon the plane indicated by the section line 8—8 of Figure 7 and shows the manner in which the valve stem holder is clamped on the valve stem;

Figure 9 is an enlarged fragmentary transverse sectional view taken substantially upon the plane indicated by the section line 9—9 of Figure 8 and shows further the manner in which the valve stem holder is clamped on the valve stem; and Figure 10 is an enlarged perspective view of still another form of valve stem holder.

Figure 1:
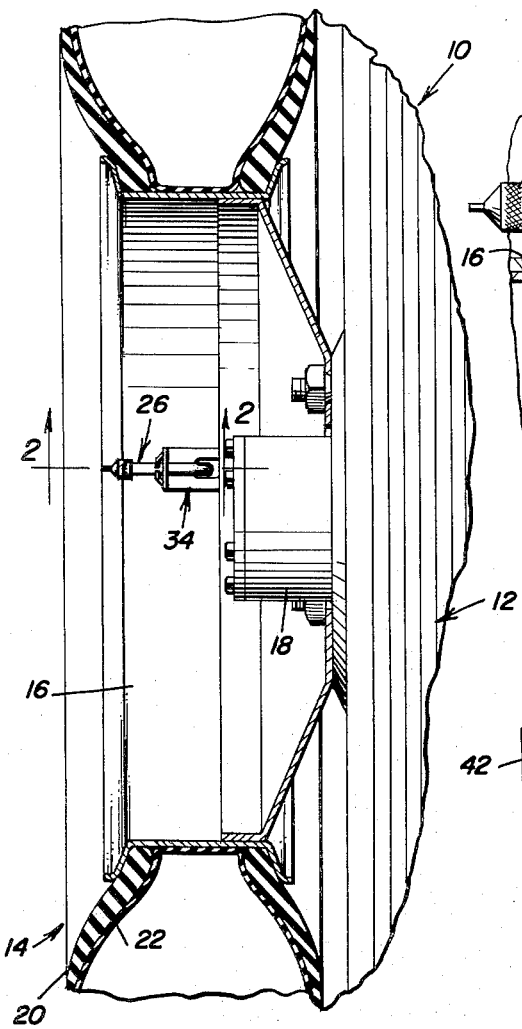
Figure 1 is a fragmentary sectional view of a dual wheel assembly and shows mounted on the valve stem of the outer wheel one of the valve stem holders which is the subject of this invention.

Referring now to the drawings in detail, it will be seen that there is illustrated in Figure 1 a portion of a dual wheel assembly which is referred to in general by the reference numeral 10. The dual wheel assembly 10 includes an inner wheel assembly 12 and an outer wheel assembly 14. The outer wheel assembly 14 includes a wheel or rim 16 which is mounted on a wheel hub 18. Carried by the wheel 16 is a tire 20 which is inflated by means of a tube 22. The wheel 16 is provided with a transversely elongated slot 24 through which an L-shaped valve stem 26 of the tube passes. The valve stem 26 includes an upstanding portion 28 which extends through the slot 24 and whose opposite end is connected to the tube 22, and a generally horizontal portion 30 which is provided at the end thereof with a cap 32.

When either of the tires of the two wheel assemblies 12 and 14 become deflated and the tire is run flat, there is a tendency for the valve stem 26 to pull through the slot 24. When this happens the tube 22 becomes free from the tire 20 and the wheel 16 and may rotate within the tire 20. This normally results either in the tire 20 being internally cut through its cords by the valve stem 26 or in sufficient heat being built up that the tube 22 melts and becomes bonded or welded to the interior of the tire 20. If either happens, the tire 20 becomes damaged beyond repair.

Figure 2:
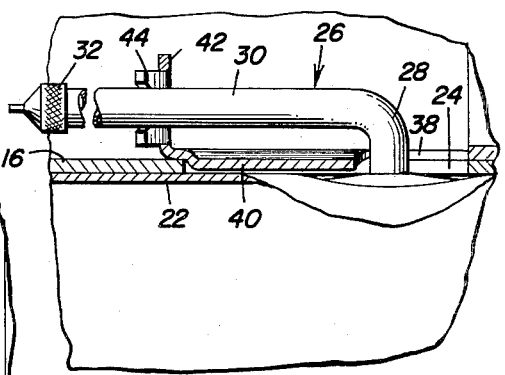
Figure 2 is an enlarged fragmentary sectional view taken substantially upon the plane indicated by the section line 2—2 of Figure 1 and shows further the relationship of the valve stem holder with respect to the valve stem and the wheel.
Figure 3:
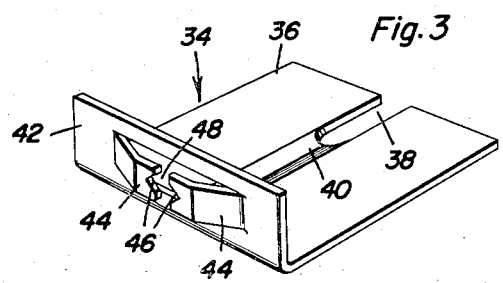
Figure 3 is an enlarged perspective view of the valve stem holder removed from the valve stem and shows the specific structural details thereof.

In order to prevent the pulling through of the valve stem 26, there has been provided a valve stem holder which is the subject of this invention. A first form of valve stem holder is illustrated in Figures 1, 2 and 3 and is referred to in general by the reference numeral 34. The valve stem holder 34 includes a generally rectangular base plate 36 which is provided in one end thereof with an elongated slot 38 which opens through an edge of the base plate 36. Extending longitudinally of the base plate 36 in alignment with the slot 38 is a depressed rib 40.

Formed integrally with the base plate 36 along the edge thereof remote from the slot 38 is an upstanding flange 42. The flange 42 has struck therefrom two opposed spring fingers 44. The spring fingers 44 have V-shaped notches 46. The notches 46 define an opening 48 through which a valve stem 26 may pass.

When the valve stem holder 34 is utilized, the cap 32 is removed from the horizontal portion 30 and the base plate 36 is shoved in place with the horizontal portion 30 extending between the spring fingers 44 to the opening 48. Further movement of the valve stem holder 34 on the valve stem 26 results in the vertical portion 28 being received in the slot 38. The final position of the valve stem holder 34 is best illustrated in Figure 2 wherein the depending rib 40 is seated in the slot 24 of the wheel 16. The spring fingers 44 are so constructed whereby the notched portions 46 grip the horizontal portion 30 of the valve stem 26 and prevent the retraction of the valve stem holder 34. At the same time, the depending rib 40 is engaged in the slot 24 and prevents transverse movement of the valve stem holder 34 with respect to the wheel 16. The vertical portion 28 of the valve stem 26 being received in the slot 38, relative movement between the valve stem 26, the valve stem holder 34 and the wheel 16 is prevented.

Figure 4:
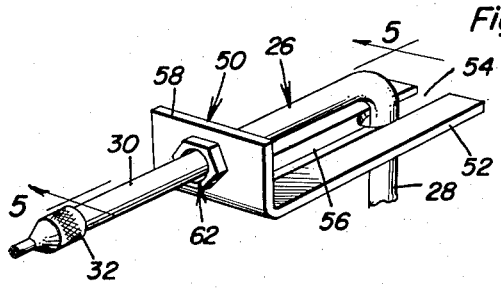
Figure 4 is an enlarged perspective view of a modified form of valve stem holder and shows the same mounted on a valve stem.

Referring now to Figures 4, 5 and 6 in particular, it will be seen that there is illustrated a slightly modified form of valve stem holder which is referred to in general by the reference numeral 50. The valve stem holder 50 includes an elongated rectangular base plate 52 which is provided adjacent one end thereof with a slot 54 which opens through an edge thereof. Formed integrally with the base plate 52 and aligned with the slot 54 is a depending rib 56 which corresponds with the rib 40. Also formed integrally with the base plate 52 remote from the slot 54 is an upstanding flange 58.

As is best illustrated in Figure 5, the flange 58 is provided with a bore 60 therethrough, the bore 60 being longitudinally aligned with the rib 56. Extending through the bore 60 is a fastener which is referred to in general by the reference numeral 62. The fastener 62 includes a bolt portion 64 and a wrench receiving head 66. The bolt portion 64 is externally threaded as at 68 and is longitudinally tapered so that the end thereof remote from the head 66 is of the smallest diameter. Also, as is best illustrated in Figure 6, the bolt portion 64 is divided into a plurality of individual segments 70 by longitudinal slots 72 which radiate from the center of the bolt portion 64.

Cooperating with the fastener 62 is a nut member 74. The nut member 74 is seated on the base plate 52 and is thus prevented from turning thereby, as in best shown in Figure 6. The nut member 74 is provided with a tapered internally threaded bore 76.

The fastener 62 is provided with a bore 78 therethrough for receiving the horizontal portion 30 of the valve stem 26. When it is desired to position the valve stem holder 50 on the valve stem 26, it is necessary to first remove the cap 32. Then with the nut 74 in place and the fastener 62 loosely threaded therein, the valve stem holder 50 is slid into position as is illustrated in Figure 4. Finally the fastener 62 is threaded further into the nut 74 and due to the taper of the internally threaded bore 76 of the nut 74, the bolt portion 64 is urged inwardly in clamping relation about the valve stem portion 30. This locks the valve stem holder 50 on the valve stem 26. The depending rib 56 is locked with the wheel 16 in the same manner as does the depending rib 40.

Referring now to Figures 7, 8 and 9 in particular, it will be seen that there is illustrated a third form of valve stem holder which is referred to in general by the reference numeral 80. The valve stem holder 80 includes a base plate 82. The base plate 82 is provided with a longitudinally extending slot 84 adjacent one end thereof and opening through an edge thereof. Aligned with the slot 84 and extending longitudinally of the base plate 82 is a depending rib 86 which corresponds to the rib 40. The base plate 82 terminates in a generally semicircular externally threaded portion 88 which is substantially an extension of the rib 86.

Overlying the base plate 82 is a clamp plate 90. The clamp plate 90 is very similar in construction to the base plate 82 and is provided adjacent one end thereof with a longitudinally extending valve stem receiving slot 92 which opens through an adjacent edge of the clamp plate 90. The clamp plate 90 is also provided with a raised rib 94 which extends longitudinally thereof and which is aligned with the slot 92. The rib 94 terminates in an externally threaded generally semi-circular cross-sectional extension 96. The extensions 88 and 96 are aligned and have threadedly engaged thereover a nut 98.

As is best shown in Figures 7 and 8, those edges of the base plate 82 and the clamp plate 90 through which the slots 84 and 92 open are hingedly connected together by means of a hinge 100. The hinge 100 includes integrally formed hinge eyes 102 on the base plate 82 and hinge eyes 104 on the clamp plate 90. Extending through the hinge eyes 102 and 104 are segmental hinge pins 106.

When it is desired to position the valve stem holder 80 on the valve stem 26, the nut 98 is removed. Then with the clamp plate 90 hingedly connected to the base plate 82, the valve stem holder 80 is slid over the valve stem 26 until the vertical portion 28 is properly positioned in the slot 84. The nut 98 is then slid over the horizontal portion 30 and threadedly engaged on the extensions 88 and 96 to clamp the clamp plate 90 relative to the base plate 82. The valve stem holder 80 is then firmly fixed relative to the valve stem 26. The projecting rib 86 not only provides clearance for the horizontal portion 30 of the valve stem 36, but also functions to be seated in the slot 24 and the wheel 16 to interlock the valve stem holder 80 with the wheel 16 and thus position the valve stem holder 80 relative to the wheel 16.

Referring now to Figure 10 in particular, it will be seen that there is illustrated a modified form of valve stem holder which is referred to in general by the reference numeral 108. The valve stem holder 108 includes a base plate 110 and a clamp plate 112. The base plate 110 and the clamp plate 112 are substantially identical to the base plate 82 and the clamp plate 90. The two differ only in that in lieu of the integral hinge eyes 102 on the base plate 82 and the hinge eyes 104 and the clamp plate 90, there is provided a pair of U-shaped connecting portions 114, the base plate 110 and the clamp plate 112 being integrally connected together. The connecting portions 114 will permit limited hinged movement between the clamp plate 112 and the base plate 110 as is required to position the valve stem holder 108 on the valve stem 26.

The base plate 110 includes an externally threaded extension 116 which corresponds to the extension 88 whereas the clamp plate 112 includes an extension 118 which corresponds to the extension 96. A nut, such as the nut 98 will be threadedly engaged on the extensions 116 and 118 and the operation of the valve stem holder 108 will be identical with that of the valve stem holder 80.

In view of the foregoing, it will be readily apparent that there has been devised several forms of valve stem holders which are so constructed whereby they may be readily clamped upon valve stems of truck tires and when so clamped on the valve stems will position the valve stems relative to the wheel on which the truck tire is mounted and in the event of the tire becoming deflated, will prevent the valve stem from pulling through the wheel. Further, because of the simplicity of the valve stem holders, they may be readily manufactured at a low cost and at the same time easily installed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tire valve stem holder comprising a base plate; an upturned flange at one extremity of and at right angles to said plate; a medial notch at the other extremity of said plate for receiving a valve stem; a medial opening through said flange; a spring finger formed in said flange at each side of said opening; V-shaped notches formed in the extremity of each finger for engaging a valve stem; and a depressed rib formed in said base plate and extending from said medial notch to said flange, said groove forming a ridge on the bottom of said plate for entering a valve opening in an automotive wheel.

2. A tire valve stem holder for preventing the pulling of a generally L-shaped valve stem through a vehicle wheel when the tube, of which the stem is a part, becomes deflated, said valve stem holder comprising: a base plate adapted to seat against a vehicle wheel; a slot in said base plate opening through one end thereof for the reception of an upstanding portion of a valve stem; an upstanding flange formed on the other extremity of said base plate; an opening in said flange for receiving a generally horizontal portion of said valve stem; and opposed spring fingers struck from the material of said flange at opposite sides of said opening to resiliently engage said horizontal portion of said valve stem for locking same in said flange.

References Cited in the file of this patent

UNITED STATES PATENTS

| 1,248,528 | Nagel | Dec. 4, 1917 |
| 1,971,881 | Tinnerman | Aug. 28, 1934 |
| 2,691,552 | Bauman et al. | Oct. 12, 1954 |
| 2,731,065 | Powers | Jan. 17, 1956 |

FOREIGN PATENTS

| 582,973 | Great Britain | Dec. 3, 1946 |

OTHER REFERENCES

"Sav-A-Tir" publication (4 pages), July 22, 1957.

"Valve Stem Aid," "Transport Topics," published by American Trucking Association, Inc., Jan. 27, 1958, page 16, referred to as Carlan.